Feb. 11, 1947.                J. E. COLLINS ET AL                2,415,417
                                  FLUID VALVE
                             Filed April 24, 1944            2 Sheets-Sheet 1

INVENTORS
JOHN E. COLLINS
CHARLES K. MORTON
BY
Hyde and Meyer

Feb. 11, 1947.  J. E. COLLINS ET AL  2,415,417
FLUID VALVE
Filed April 24, 1944   2 Sheets-Sheet 2
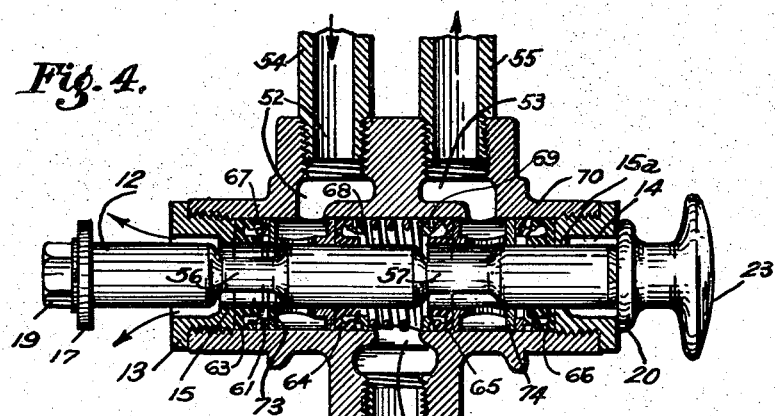
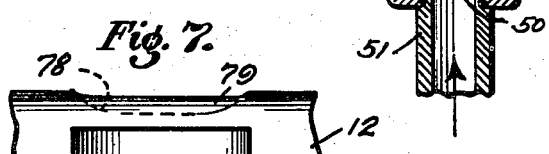
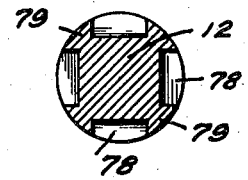
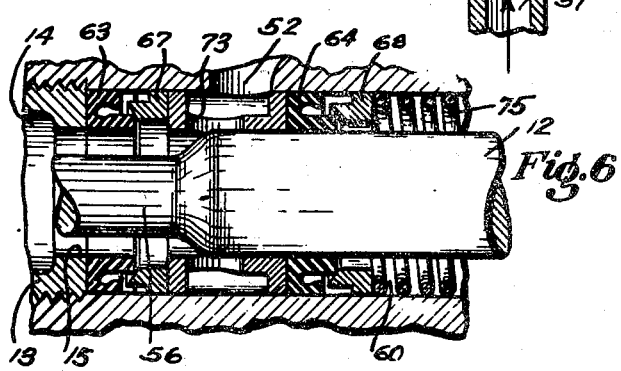
INVENTORS
JOHN E. COLLINS
CHARLES K. MORTON
BY
Hyde and Meyer Patented Feb. 11, 1947

2,415,417

UNITED STATES PATENT OFFICE 2,415,417

FLUID VALVE

John E. Collins and Charles K. Morton, Akron, Ohio, assignors to Valvair Corporation, Akron, Ohio, a corporation of Ohio Application April 24, 1944, Serial No. 532,397

4 Claims. (Cl. 251—76)

The invention relates to valves for fluid pressure transmission lines, and more particularly to valves of the type actuated by reciprocatory motion of a plunger. An object of the invention is to produce a valve of the nature indicated, provided with a novel packing arrangement whereby said packing is permanently maintained under sealing tension.

Another object of the invention is to provide a plunger valve which can be economically manufactured, and readily assembled or disassembled to permit repair or replacement of the packing elements, whenever desired.

Another object of the invention is to provide a plunger valve design wherein the packing is maintained under tension, as described, and wherein wear and tear of the packing elements is eliminated or reduced to a minimum.

Another object of the invention is to provide a valve design wherein the transmission or interruption of fluid pressure is accomplished by means of an annular recess in the plunger, which recess is registrable with suitable ports in the valve body, the plunger being movable relative to packings interposed between respecting ports, said packings being maintained under spring tension.

Other objects and advantages will be apparent from a study of the following specification, in conjunction with the accompanying drawings wherein:

Figs. 4 and 5 are longitudinal sectional views of another embodiment of the invention, showing a four way manually operatable valve in each of its two respective operating positions.

Fig. 6 is a sectional view, somewhat enlarged, of a fragmentary portion of Fig. 5.

Fig. 7 is a fragmentary view, in side elevation, of a slightly modified form of plunger, and Fig. 8 is a sectional view taken on the line 8—8 of Fig. 7.

Figure 1:
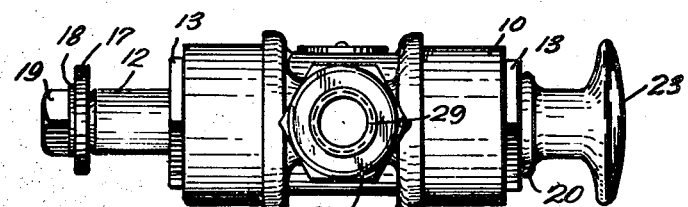
Fig. 1 is a top plan view of a three way, manually operatable valve constructed in accordance with the present invention.

Each of the valves shown in the several embodiments illustrated in the accompanying drawings comprises a generally cylindrical valve body 10 provided with an axial aperture 11 within which aperture a cylindrical plunger 12 is reciprocably movable. The opposed ends of the valve body are provided with screw plugs or caps 13 of cup-like contour, and said body is bored out centrally at 14 to provide inwardly extending annular fixed flanges or abutments 15, 15a, which provide a bearing surface for plunger 12. Endwise reciprocation of the plunger is limited by engagement between the outer faces of said caps 13 and stop members on the ends of the plunger. Said stop members in the embodiments shown include a disc washer 17 on one end of the plunger, retained in place by a lock washer 18 and headed stud 19, while the stop member on the opposed end of the plunger consists of a flange 20 on a plunger operating knob 23.

As will be understood by reference to the drawings, valving action is secured by endwise motion of the plunger 12, in conjunction with the specific contours of the valve body 10, and of the plunger.

Figure 2:
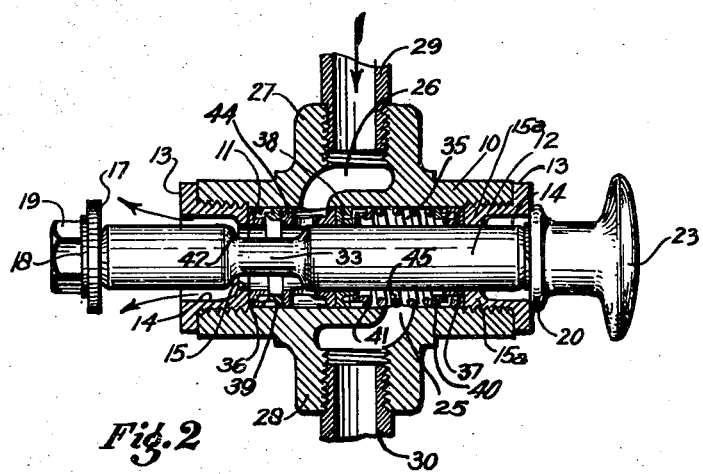
Figs. 2 and 3 are longitudinal sectional views of the valve shown in Fig. 1, showing, respectively, its alternate operating positions.
Figure 3:
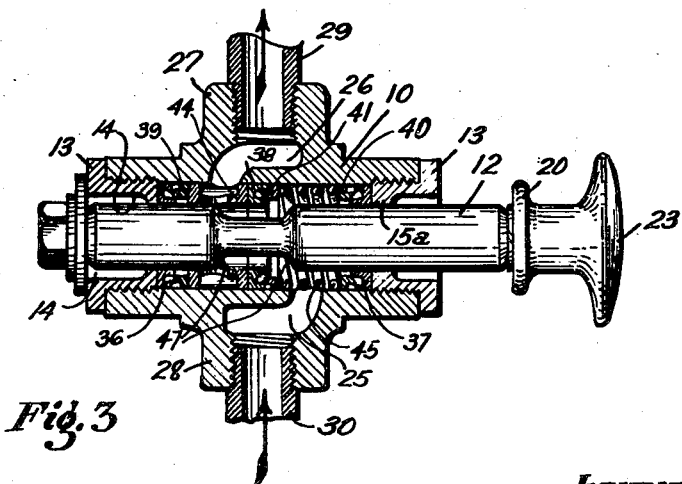

Referring now to Figs. 1, 2 and 3, the valve body shown in the particular embodiment here illustrated is provided with opposed ports 25 and 26, in communication respectively at spaced points with the axial aperture in the valve body. For convenience in making connections with the fluid pressure lines, ports 25 and 26 are bored in bosses 26 and 27 respectively, and are internally threaded throughout a portion of their length to receive conduits 29 and 30. The plunger, at an intermediate location on its length, is provided with a necked portion 33 of reduced diameter, thereby providing an annular channel or recess which, in the plunger position shown in Fig. 3 simultaneously registers with ports 25 and 26, thereby permitting fluid pressure to pass from supply conduit 30, for example, to operational discharge conduit 29, and thence to a working cylinder or other application. Movement of the plunger from the position shown in Fig. 3 to the position shown in Fig. 2 interrupts communication between ports 25 and 26 by closing port 25, but permits fluid pressure exhaust from conduit 29 through port 26 and along the recessed portion of the plunger through the opening in the annular fixed abutment flange 15 and thence to atmosphere, or otherwise, as desired.

Endwise leakage of fluid pressure is prevented by a packing arrangement now to be described. By reason of the fact that the inturned, spaced annular fixed flanges 15 and 15a extend radially inwardly into the axial bore 11 of the valve body, they define between them, and between the plunger and the valve body, an annular space 35. At opposed ends of this space, and consequently abutting flanges 15 and 15a, are flexible packing rings 36 and 37, U-shaped in section, and having their free edges inturned parallel to the plunger axis. Rings 36 and 37 may be here termed outer packing rings since they prevent escape of fluid pressure to the exterior, except when the valve is open to exhaust. A third or inner packing ring 38 of similar nature is placed between rings 36 and 37 in such position that it lies between ports 25 and 26. Abutting respectively the free edges of rings 36, 37, and 38 are spreader rings 39, 40 and 41, of metal or similar unyielding material, a face portion of rings 39, 40 and 41 which abuts rings 36, 37 and 38 respectively being beveled as shown so as to urge rings 36, 37 and 38 into snug sliding contact with the plunger and the valve body. A spacer and abutment ring 44, perforated at spaced points throughout its periphery, is disposed in recess 35 between rings 38 and 39, one or more perforations being in registry with port 25, and a helical spring 45 is disposed between rings 40 and 41, in registry with port 26. Said spacer ring, being of channel shaped cross section, affords a number of peripheral annular recesses 42 which are in registration with port 26 said construction permitting fluid flow to and from port 26 respectively dependent upon the plunger position. Said spacer ring also acts as a bearing for plunger 12. The disposal of the helical compression spring is such that it exerts endwise pressure in both directions, parallel to the plunger axis and effective on all packing rings so that seating contact is maintained between the rings, and the respective contacting surfaces of plunger and valve body. Fluid pressure entering through port 25 has free access to that portion of annular chamber 35 which is occupied by spring 45 and said pressure augments the effect of spring 45 in maintaining all packing elements under sealing compression.

The several elements located in annular space 35, including the packing rings 36, 37 and 38, the spreader rings 39, 40 and 41, the spacer ring 44 and the spring are assembled or disassembled by removing bolt 19, washers 17 and 18, and cap 13 and inserting said enumerated elements into the valve body by threading them over the plunger. Cap 13 is thereupon screwed into position, thereby placing spring 45 under compression. The alignment of the spring with the packing rings, spreader rings, and spacer ring is obviously such that it not only adjusts or moves the abutment ring 44 endwise, but also causes the three spreader rings to urge their respective packing rings into sealing contact with the inner periphery of the valve body 10 and with the outer periphery of the plunger 12.

The shoulders 47 of necked portion 33 of plunger 12 are rounded at their zone of junction with the cylindrical periphery of the plunger to eliminate wear and tear or frictional resistance when the limited movement of the plunger carries said shoulders past packing rings 36 or 38. When the plunger is in the position shown in Fig. 2, packing rings 37 and 38 prevent endwise leakage of pressure to the right or left from port 25, and when the plunger is in the position shown in Fig. 3, packing rings 36 and 37 prevent endwise leakage, to either right or left, from ports 25 and 26.

The embodiment shown in Figs. 4, 5 and 6 is in some respects similar to that shown in Figs. 1 to 3, certain changes in detail being required by the fact that Figs. 4 to 6 show a valve designed to alternately serve two pressure cylinders (or other fluid power work adaptation) pressure being held in one work line while the other is open to exhaust, and vice versa.

Referring specifically to Figs. 4 and 5, the valve body is provided with a power inlet or supply port 50, served by conduit 51, the port being substantially centrally disposed. Two outlet or operational discharge ports 52 and 53 are in communication with conduits 54 and 55 respectively, each serving an individual work source or power cylinder. The end cap construction, and plunger stops, are similar to those already described in reference to Figs. 1, 2 and 3. The plunger, however, is here provided with two necked portions 56 and 57. The outlet ports 52 and 53 are disposed in spaced relationship, one on each side of inlet port 50, so that when the plunger is in the position shown in Fig. 4, port 50 is in communication with port 53 through annular recess 60, while port 52 is open to exhaust through annular recess 61. In the position shown in Fig. 5 port 50 is in communication with port 52 while port 53 is open to exhaust.

In the packing arrangement shown in Figs. 4 to 6, four packing rings 63, 64, 65 and 66 are required, and consequently four cooperating spreader rings 67, 68, 69 and 70. Outlet ports 52 and 53 have movable spacer abutment rings, 73 and 74 respectively, in registry therewith, and perforated to permit fluid power transmission therethrough. A compression spring 75 is centrally disposed and maintains the whole packing assembly in sealing condition. The shoulders defining the annular recesses in the plunger are rounded as in the previously described embodiment.

From the foregoing description it is apparent that the fluid pressure is at all times confined to, and directed through, the intended channels by a packing arrangement involving a centrally disposed helical spring which is effective to exert endwise pressure in both directions, which pressure is operative on all packing rings. The surface contour of the plunger is such that it is readily slidable from one operating position to another despite the pressure of the packing rings.

A slightly modified form of plunger is shown in Figs. 7 and 8. In this embodiment the annularly recessed portion 33 (Fig. 2) is replaced by a plurality of slots or longitudinal grooves 78 in the cylindrical periphery of plunger 12. When a plunger thus modified is substituted, for example, for the plunger shown in Fig. 2, one or more of the slots 78 permit registry and communication between port 26 and the exhaust opening, and, in the plunger position of Fig. 3, one or more other grooves permit fluid passage from port 25 to port 26 through the annular chamber 35. The lands or ribs 79 furnish a longitudinally continuous support for the packing members and the contiguous elements of the valve assembly.

What we claim is:

1. Valve mechanism of the character described, comprising concentric radially spaced solid valve rod and tubular body members provided with two fixed end abutments closing an annular chamber between them and with two movable annular abutments spaced from each other longitudinally in said chamber, a supply connection through the body to said chamber between the movable abutments thereof, two operational discharge connections through the body to said chamber, one beyond each movable abutment, the valve rod being provided with two reduced portions forming fluid conducting channels, four annular sealing rings in said chamber, all seating away from the supply connection, one ring adjacent each abutment, and a single spiral compression spring in said chamber between the two movable abutments and exerting pressure on all four sealing rings to prevent escape of fluid past the same.

2. Valve mechanism of the character described, comprising concentric radially spaced solid valve rod and tubular body members provided with two fixed end abutments closing an annular chamber between them and with two movable annular abutments spaced from each other longitudinally in said chamber, a supply connection through the body to said chamber between the movable abutments thereof, two operational discharge connections through the body to said chamber, one beyond each movable abutment, the valve rod being provided with two reduced portions forming fluid conducting channels, four annular sealing rings in said chamber, all seating away from the supply connection, one ring adjacent each abutment, and a single spiral compression spring in said chamber between the two movable abutments and exerting pressure on all four sealing rings to prevent escape of fluid past the same, said end abutments each having an opening concentric with the valve rod axis and forming both a bearing guide for a full diameter portion of the valve rod and an exhaust opening by cooperation with the fluid conducting channel of one of said reduced portions of the valve rod.

3. Valve mechanism of the character described, comprising a tubular valve body having a cylindrical bore provided with an exhaust opening at each end, with two lateral operational discharge openings spaced apart longitudinally of the valve, and with a single lateral supply opening between them, a solid generally cylindrical valve rod of smaller diameter than said bore mounted coaxially therein for longitudinal sliding movement, two rigid end abutments which with the wall of the bore and the surface of the rod close the end exhaust openings and define an annular chamber, two movable radially perforated annular abutments in said chamber spaced from each other and from the end abutments, each of said movable abutments being located opposite an operational discharge opening, the valve rod having a central body portion of full diameter long enough to bridge the space between the two movable abutments, said rod beyond each of said movable abutments also having a reduced portion forming a fluid conducting channel and beyond that having an end portion of full diameter, said valve rod being movable at will endwise back and forth between two positions in each of which one valve channel provides communication through said chamber and one movable abutment between the supply opening and one operational discharge opening while the other channel provides communication from the other operational discharge opening through the other movable abutment and past one end abutment to an end exhaust opening, an annular end sealing ring adjacent the fixed abutment at each end of said chamber, two annular intermediate sealing rings in said chamber, one adjacent each movable abutment, and a spiral compression spring in said chamber engaging both intermediate sealing rings and effective through the same upon the movable abutments and end sealing rings, thereby to form a tight seal at each ring between the wall of the valve body and a full diameter portion of the valve rod.

4. Valve mechanism of the character described, comprising concentric radially spaced solid rod and tubular body members provided with two fixed end abutments closing an annular chamber between them and with a movable annular abutment spaced in said chamber from one end abutment, a supply connection through the body to said chamber between the movable abutment and said one end abutment thereof, an operational discharge connection through the body to said chamber on the other side of said movable abutment, the valve rod being provided with a reduced portion forming a fluid conducting channel, three annular sealing rings in said chamber, all seating away from the supply connection, one ring adjacent each abutment, and a single spiral compression spring in said chamber between the movable abutment and said one end abutment and exerting pressure on all three rings to prevent escape of fluid past the same, said end abutments each having an opening concentric with the valve rod axis and forming a bearing guide for a full diameter portion of the valve rod, and one of said end abutments providing an exhaust opening by cooperation with the fluid conducting channel of the reduced portion of the valve rod.

JOHN E. COLLINS.
CHARLES K. MORTON.

REFERENCES CITED

The following references are of record in the file of this patent:

UNITED STATES PATENTS

| Number | Name | Date |
| --- | --- | --- |
| 1,016,167 | McCulloch | Jan. 30, 1912 |
| 1,988,545 | Donn | Jan. 22, 1935 |
| 2,001,941 | Rowe | May 21, 1935 |
| 2,320,905 | Bateholts | June 1, 1943 |
| 2,071,204 | Hunt | Feb. 16, 1937 |